(12) United States Patent
Moncarz et al.

(10) Patent No.: US 12,188,691 B2
(45) Date of Patent: Jan. 7, 2025

(54) GeoHeat HARVESTING ENHANCEMENT

(71) Applicant: Geothermic Solution, LLC, Palo Alto, CA (US)

(72) Inventors: Piotr D. Moncarz, Palo Alto, CA (US); Sharat Vishwanath Chandrasekhar, Dallas, TX (US); Poodipeddi V. Suryanarayana, Plano, TX (US)

(73) Assignee: XGS Energy, Inc., Palo Alto, CA (US)

( * ) Notice: Subject to any disclaimer, the term of this patent is extended or adjusted under 35 U.S.C. 154(b) by 183 days.

(21) Appl. No.: 17/970,892

(22) Filed: Oct. 21, 2022

(65) Prior Publication Data
US 2023/0130246 A1 Apr. 27, 2023

Related U.S. Application Data

(60) Provisional application No. 63/270,191, filed on Oct. 21, 2021.

(51) Int. Cl.
F24T 50/00 (2018.01)
F24T 10/10 (2018.01)

(52) U.S. Cl.
CPC .............. F24T 50/00 (2018.05); F24T 10/10 (2018.05)

(58) Field of Classification Search
CPC . F24T 50/00; F24T 10/10; F24T 10/17; F24T 2201/00; Y02E 10/10
See application file for complete search history.

(56) References Cited

U.S. PATENT DOCUMENTS

| | | | |
|---|---|---|---|
| 827,437 A | 7/1906 | Giles | |
| 860,772 A | 7/1907 | Taylor et al. | |
| 3,058,909 A | 10/1962 | Kern | |
| 3,163,219 A | 12/1964 | Wyant et al. | |
| 4,912,941 A | 4/1990 | Buchi | |
| 6,251,179 B1 | 6/2001 | Allan | |
| 6,668,554 B1 | 12/2003 | Brown | |
| 6,672,371 B1 | 1/2004 | Amerman et al. | |
| 7,067,004 B2 | 6/2006 | Matula et al. | |
| 7,452,417 B2 | 11/2008 | Matula et al. | |
| 8,584,753 B2 | 11/2013 | Fitzpatrick et al. | |
| 8,616,000 B2 | 12/2013 | Parrella | |

(Continued)

FOREIGN PATENT DOCUMENTS

| | | |
|---|---|---|
| JP | 2001329943 A | 11/2001 |
| JP | 2012031799 A | 2/2012 |

(Continued)

OTHER PUBLICATIONS

JP Office Action Translation, mailing date: Oct. 22, 2024.

*Primary Examiner* — Hoang M Nguyen
(74) *Attorney, Agent, or Firm* — Martin Fessenmaier; Umberg Zipser LLP

(57) ABSTRACT

Systems and methods for improved geoheat harvesting enhancements are presented in which a wellbore contains a closed loop geoheat harvesting system that is thermally coupled to a hot and dry rock formation via thermal reach enhancement structures that extend from the wellbore into the formation and that are filled with a thermally conductive filler. Preferred configurations and/or operational parameters are determined by a model that calculates heat flow in a three-dimensional system considering time changes and the influence of the thermal reach enhanced intrinsic thermal conductivity of the rock.

16 Claims, 4 Drawing Sheets

(56) References Cited

U.S. PATENT DOCUMENTS

| | | |
|---|---|---|
| 9,091,460 B2 | 7/2015 | Parrella, Sr. |
| 9,845,423 B2 | 12/2017 | Frantz et al. |
| 10,113,106 B2 | 10/2018 | Wadekar |
| 10,954,924 B2 | 3/2021 | Moncarz et al. |
| 11,085,671 B2 | 8/2021 | Gheysens |
| 11,125,471 B2 | 9/2021 | Marsh et al. |
| 11,299,970 B2 | 4/2022 | Cook |
| 11,656,002 B2 | 5/2023 | Nevison et al. |
| 2003/0187583 A1 | 10/2003 | Martin et al. |
| 2006/0210631 A1 | 9/2006 | Patel et al. |
| 2007/0125274 A1 | 6/2007 | Miller |
| 2007/0163805 A1 | 7/2007 | Trevisani |
| 2008/0223041 A1 | 9/2008 | Reynolds |
| 2009/0211757 A1 | 8/2009 | Riley |
| 2010/0270001 A1* | 10/2010 | Parrella .............. F24T 10/10 165/185 |
| 2010/0276115 A1* | 11/2010 | Parrella .............. F24T 10/30 165/45 |
| 2011/0220341 A1* | 9/2011 | Kidwell .............. G01K 17/00 165/200 |
| 2011/0232858 A1 | 9/2011 | Hara |
| 2012/0247766 A1 | 10/2012 | Hemmings |
| 2015/0292774 A1* | 10/2015 | Kang .............. F24T 10/30 165/45 |
| 2020/0033014 A1* | 1/2020 | Ballegeer .............. F25B 30/06 |
| 2020/0191444 A1 | 6/2020 | Nevison et al. |
| 2020/0224520 A1* | 7/2020 | Curlett .............. E21B 28/00 |
| 2021/0071063 A1 | 3/2021 | Stone |
| 2021/0348804 A1 | 11/2021 | Marsh et al. |
| 2021/0356174 A1 | 11/2021 | Alharbi et al. |
| 2024/0228868 A1 | 7/2024 | Werries et al. |

FOREIGN PATENT DOCUMENTS

| | | |
|---|---|---|
| WO | 2014092940 A1 | 6/2014 |
| WO | 2022018674 A1 | 1/2022 |
| WO | 2024044251 A1 | 2/2024 |

* cited by examiner

GeoHeat HARVESTING ENHANCEMENT

This application claims priority to our copending U.S. Provisional patent application with the Ser. No. 63/270,191, filed Oct. 21, 2021, incorporated by reference herein.

FIELD OF THE INVENTION

The field of the invention is systems and methods for geoheat harvesting from a hot and dry geological formation using a closed loop geothermal system (CLGS) that is thermally coupled to a thermal reach enhancement (TRE) in the formation and modeling systems and methods to optimize operational parameters and configuration of the TRE and CLGS.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Power generation from renewable energy resources such as solar, wind, and wave energy have become increasingly feasible and economical over the last decade and are found in numerous countries. While attractive in terms of operational simplicity, the so generated power is necessarily intermittent and requires significant energy (typically electrical) storage capacity. Conventional geothermal power plants that use heated water/steam from a formation advantageously avoid problems with intermittent power production, however, have a series of disadvantages inherent in their concept: Most significantly, water is increasingly becoming a scarce resource, and where the water from a geothermal well is pumped back to the formation, issues with contamination and/or seismicity concerns are often encountered. In addition, most conventional geothermal power plants incur high exploration, operation, and maintenance costs.

Some of these issues may be addressed using an open loop, classical enhanced geothermal system (EGS)) in which a working fluid flows through hydraulic fractures in a hot formation as is exemplarily described in U.S. Pat. No. 11,125,471. While such open loop systems can at least conceptually harvest significant quantities of energy, these systems require direct fluid interaction with the formation, which in many cases complicates well design and materials selection. Moreover, not all of the working fluid from the injector well will reach the producer well, leading to losses of working fluid and harvested energy, and therefore demand additional injected working fluid, leading to associated environmental impact and water use.

In other methods, heat can be harvested from hot dry rock using closed loop systems as is described, for example, in US 2020/0011151. Most closed loop systems advantageously eliminate problems associated with geothermal power generation based on heated water/steam extracted from the formation and will eliminate interior pipe and turbine corrosion problems otherwise often encountered with traditional water/steam-based geothermal heat recovery. Moreover, closed loop systems eliminate odors associated with hot water harvesting and avoid seismicity concerns from water removal and injection and as such will have substantially no environmental emissions or introduction of contaminants into the formation.

Unfortunately, most if not all of the hot dry rock energy harvesting systems suffer from rapid thermal decline due to the low intrinsic thermal conductivity of the geological formation. Viewed from a different perspective, currently known hot dry rock energy harvesting systems will have a mismatch between the availability of thermal energy in the formation surrounding the wellbore and thermal conductivity of the formation at the wellbore, which may be further exacerbated by a mismatch in the mass flow of a working fluid (typically water) through the closed loop system.

Thus, even though various systems and methods of energy harvesting from a heated geological formation are known in the art, all or almost all of them suffer from several drawbacks. Therefore, there remains a need for systems and methods that allow for the production of thermally effective geoheat harvesting systems.

SUMMARY OF THE INVENTION

The inventive subject matter is directed to various improved systems and methods of thermal energy harvesting from a hot dry geological formation that include thermal reach extension structures in the hot dry rock that contain high thermal conductivity materials to so increase the intrinsic thermal conductivity surrounding a closed loop geoheat harvesting system. In further preferred aspects, the closed loop geoheat harvesting system and thermal reach extensions are configured using an algorithm and/or simulation tool that provides optimized deployment and operational parameters for the closed loop geothermal system and thermal reach enhancement structure.

In one aspect of the inventive subject matter, the inventors contemplate a method of installing a closed loop geoheat harvesting system that includes a step of obtaining data from a deployment location. The obtained data are then used in a model that determines one or more configuration and/or operational parameters for a closed loop geoheat system, wherein the model further uses determined or calculated thermal conductivity of a formation at the deployment location. The closed loop geoheat system is then constructed and assembled based on the configuration and/or operational parameters determined by the model.

In some embodiments, the data from the deployment location are obtained from a rock sample taken at the deployment location and/or a sensor at the deployment location. Among other options, suitable data from the deployment location will include temperature data, location data, range data, thermal conductivity data, rock composition data, and/or principal stress data. In further embodiments, the determined thermal conductivity of the formation is an intrinsic thermal conductivity that is determined from a retrieved rock sample, while the calculated thermal conductivity of the formation may be a modified intrinsic thermal conductivity that is based on an intrinsic thermal conductivity and a thermal reach enhancement structure within the formation. In such case, it is generally preferred that the thermal reach enhancement structure comprises a thermally conductive material that has a thermal conductivity that is greater than the thermal conductivity of the formation without the thermal reach enhancement structure.

For example, contemplated thermal reach enhancement structures may have a longitudinal geometry or a radial geometry. Moreover, it is also contemplated that the thermal reach enhancement structure may also be thermally coupled to a thermally conductive cement that is located between the thermal reach enhancement structure and a casing of the closed loop geoheat system. Most typically, but not necessarily, the thermally conductive filler may have a k-value of at least 50 W/m ° K.

In still further contemplated embodiments, the model will calculate heat flux using a finite volume (3D) numerical calculation. Preferably, but not necessarily, the model will calculate the heat flux as a function of time at a wall of a casing of the closed loop geoheat harvesting system, and/or the model will further calculate heat flux from the formation into a mass flow of a working fluid in the closed loop geoheat harvesting system. It is still further contemplated that the model will use a plurality of calculations during a time interval at which a working fluid circulates in the closed loop geoheat system, wherein in each of the calculations thermophysical properties are re-computed. Among other options, it is contemplated that the configuration and/or operational parameters will include the mass flow rate of a working fluid, the length of a conduit for heat transfer in the deployment location, the effective width of a thermal reach enhancement structure, and/or the effective length of a thermal reach enhancement structure.

Consequently, and based on exemplary model calculations, a closed loop geoheat harvesting system may comprise a wellbore that extends from the topside to a deployment location and that contains a closed loop circuit for a working fluid. Most typically the closed loop circuit has a casing that is thermally coupled to a wall of the wellbore via a thermally conductive cement, and the walls of the wellbore further comprise a thermal enhancement structure that is thermally coupled to the thermally conductive cement and that is filled with a thermally conductive filler. In such systems, the deployment location will have a formation temperature of at least 250° C., the working fluid will have a return temperature of at least 150° C., and the thermal enhancement structure will have a longitudinal complex multi-fractured geometry with a width of between 10 and 50 mm.

For example, the thermally conductive cement and/or the thermally conductive filler may have a k-value of at least 5 W/m ° K and 50 W/m ° K, respectively, and/or the working fluid will be water. Preferably, the casing that is thermally coupled to the wall of the wellbore via the thermally conductive cement will have a length of at least 3 km. In further examples of such systems, the length of the thermal enhancement structure will be at least 15 m as measured from the wellbore, and/or the working fluid will have an inlet temperature of more than 100° C. and a flow rate of 15-25 kg/s.

Various objects, features, aspects, and advantages of the inventive subject matter will become more apparent from the following detailed description of preferred embodiments, along with the accompanying drawing figures in which like numerals represent like components.

DETAILED DESCRIPTION

The inventors have now discovered that performance and efficiency of a closed loop geothermal system can be optimized by matching various parameters of a formation at a deployment location with various configurations and/or operational parameters of the closed loop geothermal system to so optimize heat flow from the formation to a working fluid. Indeed, upon careful analysis, the inventors discovered that a model can be constructed that allows for simulation of various parameters to so provide optimized design choices with regard to various factors that substantially influence effective heat transfer such as geometry and/or placement of thermal reach enhancement structures, materials used within such structures, properties of thermally conductive cement coupling the thermal reach enhancement structures to a casing of the closed loop geoheat harvesting system, the length of the harvester casing, and mass flow of the working fluid in the closed loop geoheat harvesting system.

In this context, it should be appreciated that prior attempts by various parties to scale closed loop geothermal systems to an economically viable size have largely failed for a number of reasons. Among other causes, any system that harvests naturally hot water or steam (e.g., conventional geothermal and EGS) will not scale, typically due to the substantially fixed production rate of hot water or steam at a given location. On the other hand, systems that depended on the intrinsic thermal conductivity of the rock formation have also failed to scale as such systems required very long exposure to the resource to harvest a reasonable amount of thermal energy. Similarly, all or almost all systems that operate at formation temperatures of equal or less than 200° C. also fail to scale, as will any closed loop systems without sufficient length in the target temperature zone.

In an attempt to solve such difficulties, the inventors contemplated that heat transfer in formations could be significantly improved beyond the intrinsic thermal conductivity of the formation where thermal reach enhancement structures are placed into the formation that reach well beyond the wellbore and that provide an increased thermal conductivity by way of filling such structures with a thermally conductive material that has a conductivity that is significantly greater than that of the formation. As a consequence, the thermal energy transfer surface of such modified wellbores is significantly enhanced and geoheat harvesting is therefore substantially increased.

Figure 1:
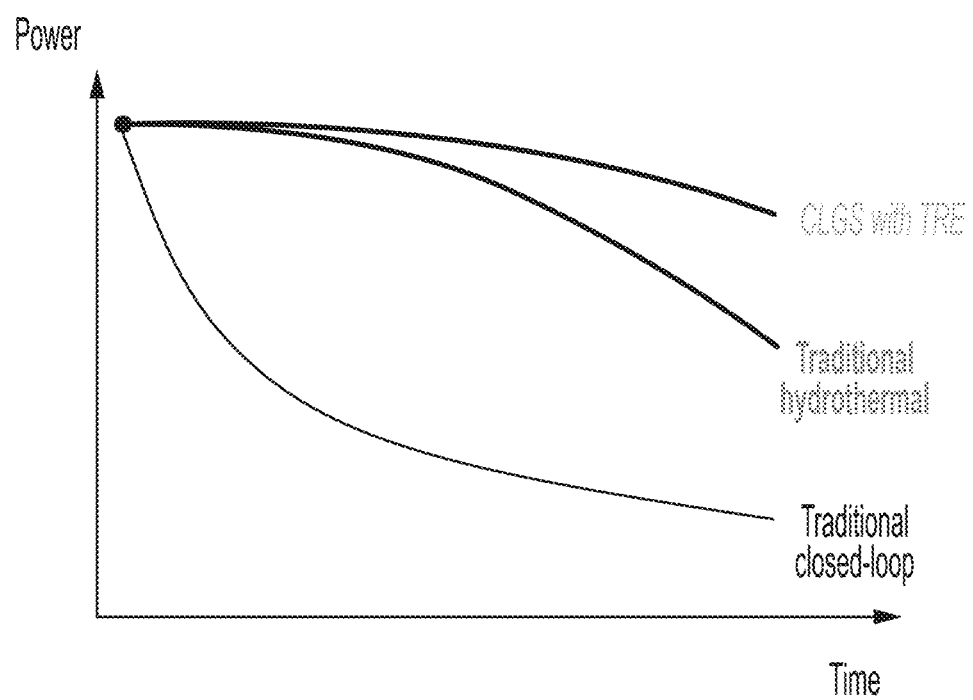
FIG. 1 is an exemplary graph depicting power loss over time for various heat recovery systems.

To that end, the inventors contemplated at least two distinct types of thermal reach enhancement structures that can be generated using conventional devices and methods known from oil and gas operations. For example and depending on the particular rock formation and manner of generation of fissures in the rock surrounding the wellbore, thermal reach enhancement structures can be configured as longitudinal structures ('bi-winged transverse fins') or as radial structures ('radial fins'). FIG. 1 schematically and exemplarily illustrates the significant differences in heat harvest (shown as power production) over time. Here, the upper curve shows a closed loop geothermal system with thermal reach enhancement structures, whereas the middle curve illustrates heat harvest of a traditional hydrothermal power plant that has reduced power output due to reduced water/steam production rates. An exemplary power production over time for a conventional closed loop geothermal system is shown by the lower curve, demonstrating loss in efficiency due to ineffective heat transfer.

Figure 2:
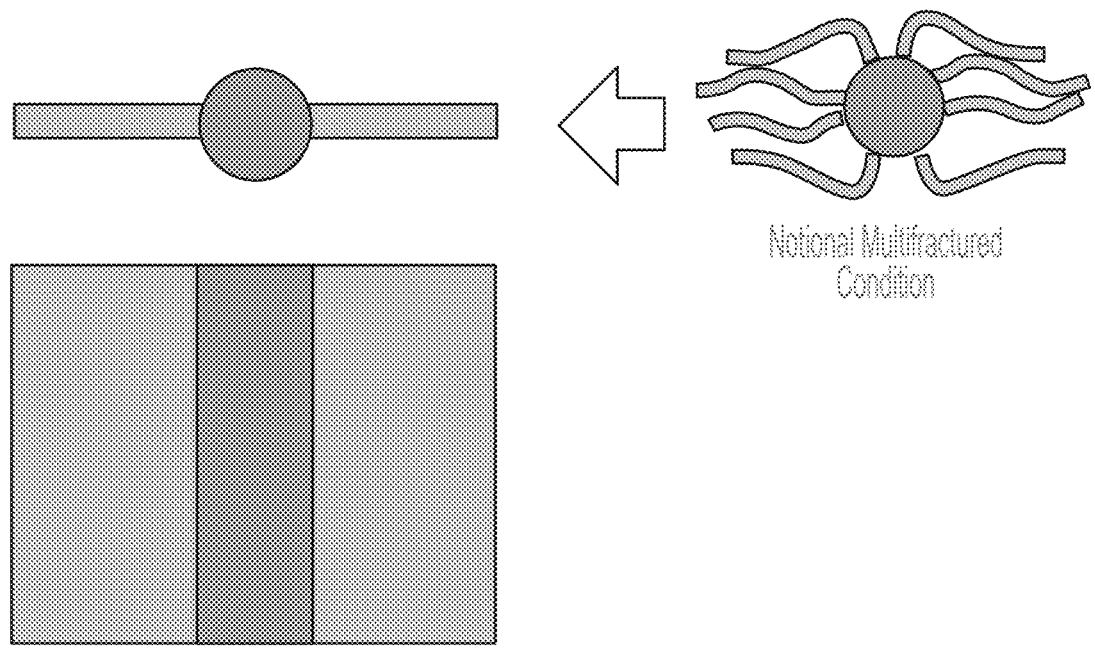
FIG. 2 schematically illustrates various views of an exemplary transverse thermal reach enhancement structure.
Figure 3:
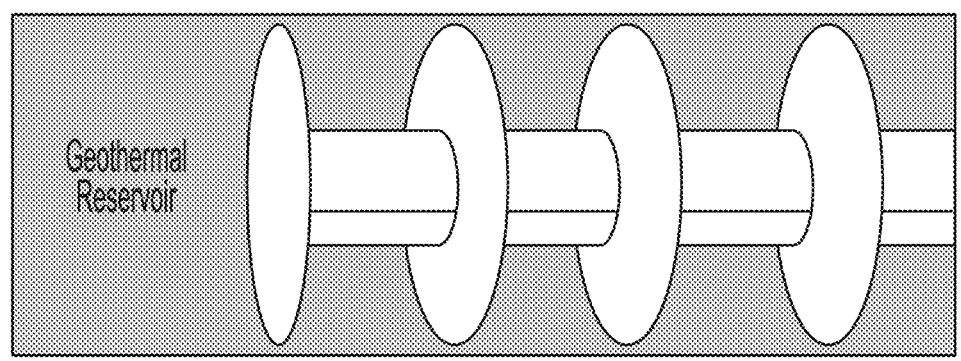
FIG. 3 schematically illustrates an exemplary perspective view of a radial thermal reach enhancement structure.

FIG. 2 schematically illustrates an exemplary transverse thermal reach enhancement structure that extends in typically opposite directions from the wellbore. As will be readily appreciated, the specific conditions in the formation such as stress planes in the formation or existing boundaries may at least in part determine the course and direction of the fissures. On the other hand, as exemplarily and schematically depicted in FIG. 3, the thermal reach enhancement structures may extend from the wellbore in a disk like orientation, and it is once more noted that such fissure structures can be generated using methods known in the art.

Figure 4:
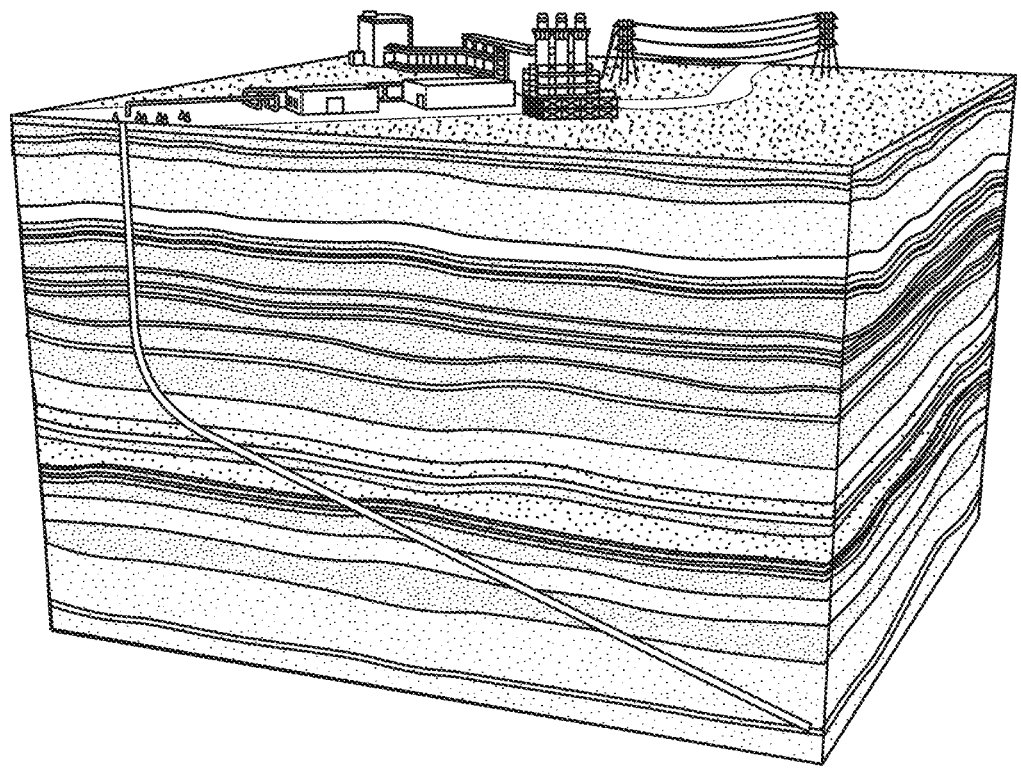
FIG. 4 schematically illustrates an exemplary closed loop geoheat harvesting system with thermal reach enhancement structures according to the inventive subject matter.
Figure 5:
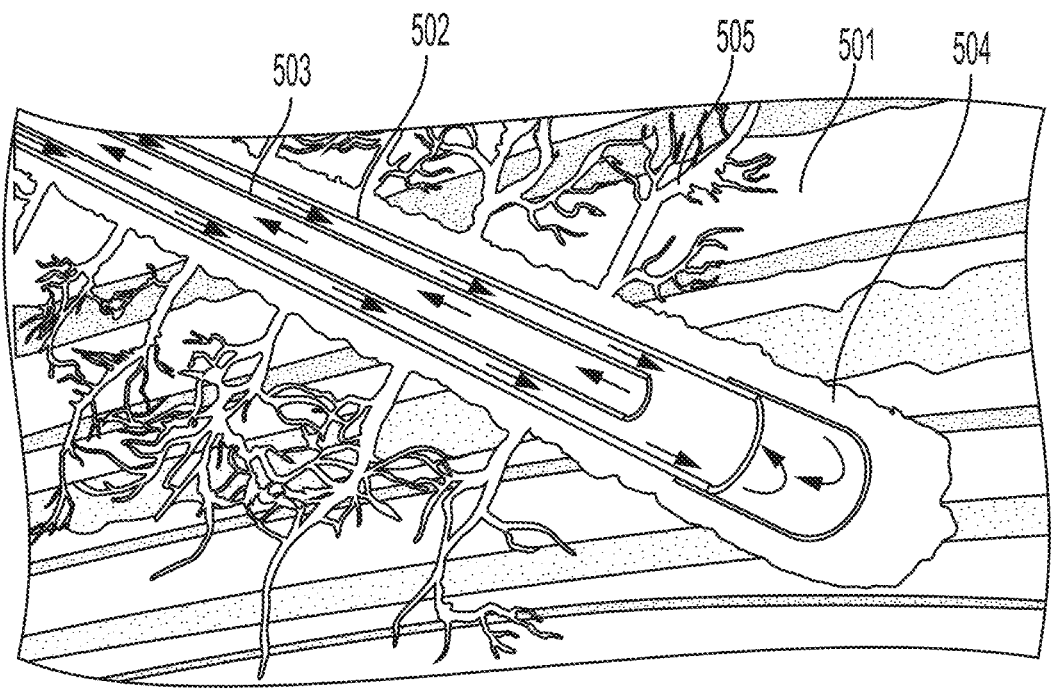
FIG. 5 schematically illustrates an exemplary detail view of the closed loop geoheat harvesting system with thermal reach enhancement of FIG. 4.

FIG. 4 depicts an exemplary closed loop geothermal system (not to scale) in which a top side power generation station is thermally coupled (typically via a heat exchanger) to the closed loop circuit of a heated working fluid that circulates in the closed loop geothermal system. FIG. 5 depicts a downhole detail view of the end of a closed loop circuit at the deployment location in dry hot rock 501. Casing 502 circumferentially encloses a (typically insulated) return pipe 503, and the working fluid traveling downhole in the annular space between the casing and the return pipe is heated by the heat from the rock formation 501. In this exemplary illustration, the casing is embedded in a thermally conductive cement 504, which is in thermal communication with transverse fissures 505 that are filled with a thermally conductive filler.

Here, it should be noted that the thermally conductive cement and the thermally conductive filler have a thermal conductivity that is higher than that of the hot rock in the formation. Note also that the longitudinal thermal reach enhancement structure is not a simple channel but resembles more a dendritic structure, which further increases the thermal heat exchange surface area with the surrounding rock. For example, and as is discussed in more detail below, it is generally preferred that the thermally conductive cement and the thermally conductive filler have a thermal conductivity coefficient that is significantly higher than that of the surrounding formation, such as for example, at least 1.5-fold higher, or at least 2.5-fold higher or at least 5-fold higher. Therefore, the thermally conductive cement may have a thermal conductivity coefficient of at least 2 W/m ° K, and more typically at least 3 W/m ° K, or at least 5 W/m ° K, while the thermally conductive filler may have a thermal conductivity coefficient of at least 25 W/m ° K, and more typically at least 35 W/m ° K, or at least 50 W/m ° K.

Using such system, it should therefore be appreciated that difficulties associated with inefficient heat harvest can be overcome in at least two ways: First, the thermally conductive cement and the thermally conductive filler will ensure tight and intimate thermal contact between the formation and the casing of the closed loop geoheat harvesting system. Moreover, due to the expanded high thermal k surface area (and material connecting the surface area to the casing) afforded by the thermal reach enhancement structure(s) a substantially larger area of heat transfer is available for heat harvesting.

To ascertain that such systems and methods will indeed provide a significant advantage over conventional closed loop geoheat harvesting systems, the inventors set out to model the heat transfer from a dry hot formation into a working fluid circulating in a closed loop. Since heat transfer in closed loop geoheat harvesting systems with thermal reach enhancement structures comprises a number of complex variables, the inventors used an overall approach in which the overall model comprised two portions: (1) A thermal reach enhancement formation model taking into account the intrinsic thermal conductivity of the rock and/or a modified intrinsic thermal conductivity taking into account the thermal conductivity of the rock with the thermal reach enhancement structures; and (2) a wellbore flow model that is coupled to the thermal reach enhancement formation model.

Therefore, it should be appreciated that such model not only allowed for determination and/or adjustment of variables such as thermal k values of materials used, geometry and/or size of thermal reach enhancement structures, temperature of the formation at the deployment location, etc., but also for determination and/or adjustment of variables within the closed loop system containing the working fluid such as deployment depth, working fluid temperature, mass flow of working fluid, etc. Viewed from a different perspective, the overall model allows proper dimensioning of the configuration and/or setting of suitable operational parameters for the closed loop geoheat system for a large number of geological formations and their attendant geological features.

Consequently, a simulation can be implemented that is able to take into account various formation parameters, and especially rock temperature at the deployment location, heat flux within the formation at the deployment location (intrinsic thermal conductivity) and improvements in the heat flux within the formation by use of thermal reach enhancement structure(s) at the interface between the formation and the casing of the closed loop geothermal system (modified intrinsic thermal conductivity), as well as various configuration and/or operational parameters of the closed loop geothermal system, and especially depth and/or length of the closed loop geothermal system at the deployment location, dimension of the casing and return pipe and/or mass flow through the closed loop geothermal system, etc.

In one preferred example, the thermal reach enhancement formation model was based on a two dimensional transient formulation with a longitudinal thermal reach enhancement structure as exemplarily shown in FIG. 2 and used a finite volume numerical approach. In that context, it should be noted that use of the finite volume numerical approach allowed for three dimensional modeling that prior modeling systems did not account for. Moreover, the thermal reach enhancement formation model also calculated the heat flux as a function of time at the wall of the casing. The wellbore flow model was then based on calculations as to enthalpy formulation and heat flux multipliers from the above analysis coupled to the wellbore flow model.

More particularly, the following block-structured coordinate invariant finite volume approach was used: Governing equations were integrated over control volumes, and a Gauss Divergence Theorem was applied on RHS to express conservation in terms of interface fluxes. Moreover, a 'resistors in parallel' (weighted harmonic mean) approach was employed to determine interface conductivity in terms of (known) nodal conductivities, and boundary conditions were applied at faces with no neighbors. A sparse linear system was then assembled in terms of nodal temperatures, and the liner system was solved to obtain temperatures using a stabilized pre-conditioned bi-conjugate gradient algorithm with incomplete LU preconditioner (Van der Vorst, 1992).

Figure 6:
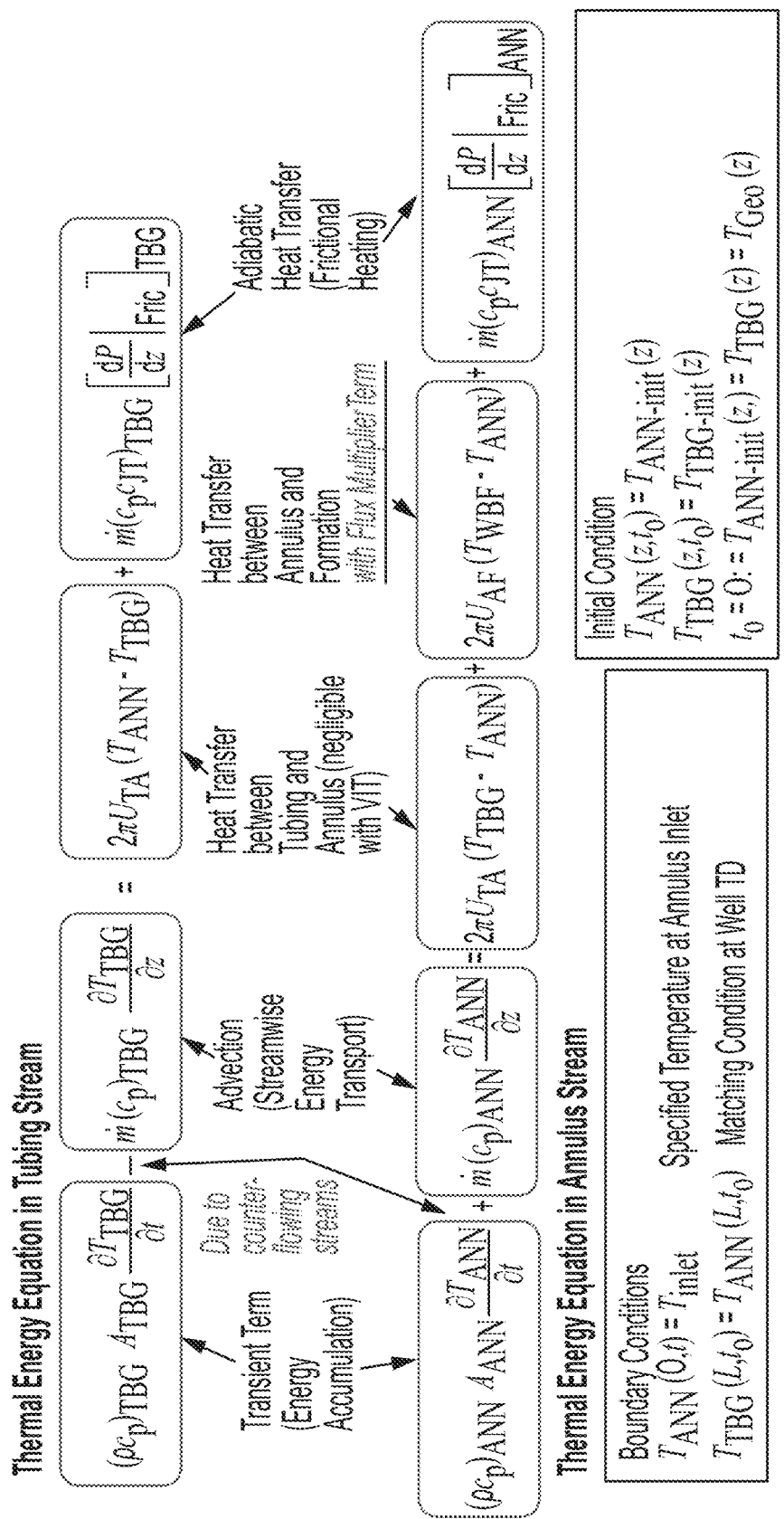
FIG. 6 illustrates exemplary thermal energy equations in the specific streams in the closed loop geothermal system.

The coupling to the wellbore used a thermal energy equation in the tubing stream in which a transient term (energy accumulation) minus advection (streamwise energy transport) equated the heat transfer between the tubing and the annulus plus the heat transfer between the annulus and the formation, plus adiabatic heat transfer (frictional heating) as is exemplarily depicted in FIG. 6. The circulation period was then broken down into sub-intervals to enable re-computation of thermophysical properties, and within each time sub-interval, a Laplace Transformation of Governing Equations converted the system of first order PDEs (non-homogenous Wave equations) to a pair of ordinary differential equations in the frequency domain.

$$\frac{\partial T}{\partial t} + C\frac{\partial T}{\partial z} = FT + G \rightarrow \frac{d\Theta}{dz} = \left(\frac{F-s}{C}\right)\Theta + \frac{G}{Cs} + \frac{1}{C}T(0)$$

Formation transients were modeled in a finite domain and the exact solution was coupled to the wellbore through a Duhamel Convolution Integral in the frequency domain. A spatial derivative was approximated by a backward finite difference in the streamwise direction. An alternating direction marching algorithm with a set of simultaneous equations for the tubing and annulus temperature was solved at each depth location, and a Gaver Stehfest Function Sampling algorithm was used to transform temperatures back to the physical space. Finally, pressure profiles were determined from frictional and hydrostatic components. In such model, the parameters of the problem included the resource (formation temperature), the ratio of thermal fill conductivity to formation conductivity, the effective width and length of the thermal reach enhancement structure, the mass flow rate of the working fluid, and the thermal properties of the working fluid and the resource (formation temperature). As should be readily appreciated, such simulation and models can be performed on a single computer or computer network, locally or remotely on a server farm.

Using the so developed model, the inventors simulated and validated numerous closed loop geoheat harvesting systems as being capable of continuous operation to recover/deliver at steady-state thermal energy in an amount of at least 5 MWt, and more typically at least 7 MWt, or at least 8 MWt, or at least 9 MWt, or at least 10 MWt, or at least 11 MWt, or at least 12 MWt. Such energy harvest is particularly impressive as currently known closed loop geoheat harvesting system demonstration projects had a thermal output of well below 1 MWt.

For example, in the validated closed loop geoheat harvesting systems, suitable systems comprised a wellbore that extended from a topside location to a deployment location (typically at a depth of at least 500 m) and contained a closed loop circuit for a working fluid. The heat content of the working fluid was then recovered in a heat exchanger that was thermally coupled to a turbine for electric power generation. The closed loop circuit in these cases had a casing that was thermally coupled to the wall of the wellbore via a thermally conductive cement, and the walls of the wellbore further included thermal enhancement structures that were (a) thermally coupled to the thermally conductive cement and (b) that were filled with a thermally conductive filler having a thermal conductivity that was higher than that of the thermally conductive cement. Both the thermally conductive cement and the thermally conductive filler had a thermal conductivity that was higher than that of the hot dry rock at the deployment location. For example, in some cases the thermally conductive cement had a k-value of at least 5 W/m °K while the thermally conductive filler had a k-value of at least 50 W/m °K.

Furthermore, the deployment location in the validated cases had a formation temperature of at least 250° C., and the thermal enhancement structures had longitudinal complex multi-fractured geometry with a width of between 10 and 50 mm and typically a length of at least 10 m as measured from the wellbore. In most of these cases, the working fluid (typically water) had a return temperature of at least 150° C., an inlet temperature of no more than 110° C., and the working fluid was circulated at a flow rate of 15-25 kg/s. Moreover, the casing that was thermally coupled to the wall of the wellbore via the thermally conductive cement had a length of at least 1 km, and more typically at least 2 km or at least 3 km.

With respect to formation temperatures it is generally contemplated that suitable closed loop geoheat harvesting systems will be installed at locations that provide a dry formation that has a temperature of at least 250° C. at the deployment location, however, higher formation temperatures are also contemplated and include temperatures of at least 275° C., or at least 300° C., or at least 325° C., or at least 350° C., or at least 375° C., or at least 400° C., or at least 425° C., or at least 450° C., and even higher. Moreover, it is generally preferred that the length of the conduit that is in the target location has a casing that is thermally coupled to the wall of the wellbore via thermally conductive cement and the TREs has a length of at least 0.5 km, and more preferably at least 1 km. However, and as is shown in more detail below, longer lengths are generally preferred as additional length (e.g., above 1 km) have been demonstrated in the inventors' simulations to significantly increase thermal energy recovery. For example, Table 1 below shows that the length of the closed loop geoheat harvesting system (that is in thermal contact with the deployment location) substantially increased thermal energy harvest.

TABLE 1

| Additional Length (km) | Well TD (m MD) | Exit Temp. (° C.) | MWt | % MWt Enhancement |
| --- | --- | --- | --- | --- |
| 0 | 4,219 | 169.6 | 5.40 | 0 |
| 1 | 5,219 | 189.7 | 6.90 | 28% |
| 2 | 6,219 | 207.2 | 8.26 | 58% |
| 3 | 7,219 | 218.8 | 9.51 | 76% |

In addition, it should be noted that the wellbore will typically have a vertical orientation for at least some distance prior to reaching the deployment location (i.e., location in the dry hot rock at which thermal energy harvest is performed), and that the orientation of the wellbore may be vertical throughout the entire length, or that at least some of the wellbore may be deviated towards horizontal (e.g., at an angle of 30 degrees, or 60 degrees or even 90 degrees from vertical).

Moreover, it is generally contemplated that the wellbore will include one or more thermal reach enhancement structures, and among other structures, longitudinal and radial structures are especially contemplated. In further preferred aspects, it should be appreciated that where the TRE is a longitudinal structure, such structure may be present throughout the entire length of the wellbore in the deployment location or may be present in multiple segments throughout the length of the wellbore in the deployment location. On the other hand, where the TRE is a radial structure, multiple TREs along the wellbore are generally preferred. Therefore, the number of TRE structures may vary considerably, and it is contemplated that the wellbore may have between 1 and 100 (and in some cases even more) TRE structures.

Regardless of the specific configuration, the TRE structure in the wellbore will generally extend from the wellbore into the rock formation of the deployment location, and the length of the TRE structure will typically be at least 1 m, or at least 2 m, or at least 5 m, or at least 5 m, or at least 15 m, or at least 20 m, or at least 25 m, and in some cases even more (as measured as a distance between the wellbore and the distal end of the TRE structure). In further contemplated aspects, the thickness (width) of the TRE structure will be significantly less as compared to rock fractures commonly used with oil and gas exploration. For example, suitable TRE structure thickness will be between 5 and 7.5 mm, or between 7.5 and 15 mm, or between 10 and 30 mm, or between 30 and 50 mm, and in some cases somewhat wider. Therefore, exemplary TRE structures may have a width between 5 and 30 mm, or between 10 and 50 mm, or between 25-80 mm. Notably, the inventors discovered that TRE structure width in at least some models was a significant operational parameter for effective heat harvesting, and that in such cases the width at the wellbore boundary was of significant impact (e.g., having a width of between 10 and 50 mm). Still further, and regardless of the specific configuration, it is generally preferred that the TRE structure is not a single linear break in the rock formation, but that the TRE structure will be formed as a complex structure (such as a reticular or dendritic structure) as is exemplarily depicted in FIG. 5. Advantageously, such complex structure will provide for an even larger thermal exchange surface with the remainder of the unfractured rock in the deployment location.

As will be readily appreciated, the TRE structures contemplated herein will be filled with a thermally conductive filler material that has a k value (thermal conductivity coefficient) that is greater than the k value of the thermally conductive cement in the borehole surrounding the casing of the closed loop geoheat harvesting system, and that is also greater than the intrinsic k value of the unfractured rock in the formation at the deployment location. For example, suitable thermally conductive filler materials will have a k value of at least 20 W/m ° K, or at least 30 W/m ° K, or at least 40 W/m ° K, or at least 50 W/m ° K, or at least 75 W/m ° K, or at least 100 W/m ° K, or at least 500 W/m ° K, and even higher.

In other examples, the thermally conductive cement materials in the wellbore will have a k value of at least 2 W/m ° K, or at least 3 W/m ° K, or at least 4 W/m ° K, or at least 5 W/m ° K, or at least 7.5 W/m ° K, or at least 10 W/m ° K, or at least 15 W/m ° K, and even higher. Viewed from a different perspective, the k value of the thermally conductive filler materials will be at least 2-fold, or at least 5-fold, or at least 10-fold, or at least 25-fold, or at least 50-fold, or at least 100-fold higher than the k values of the thermally conductive cement materials. Most typically, and depending on the type of rock, the rock in the formation at the deployment location will have an intrinsic k value of between about 0.6-0.9 W/m ° K, or between about 0.9-1.5 W/m ° K, or between about 1.5-2.5 W/m ° K, or between about 2.5-3.5 W/m ° K, or between about 3.5-4.5 W/m ° K. As can be seen from the simulation results in Table 2, the impact of the k values of the thermally conductive filler materials relative to the k values of the formation had an unexpectedly high impact on the heat energy harvest.

TABLE 2

| K ratio | Exit Temp. (° C.) | MWt | % MWt Enhancement |
|---|---|---|---|
| 1 | 151.0 | 3.84 | 0 |
| 33 | 159.5 | 4.56 | 19% |
| 100 | 169.6 | 5.40 | 41% |
| 333 | 190.4 | 6.97 | 82% |
| 1,000 | 213.6 | 8.84 | 130% |

For example, contemplated thermally conductive cement compositions will include a mixture of cementitious material, a retarder, and one or more high-thermal k additives. In some embodiments, improved workability results from the use of a retarder that allows placement of the cement composition in the wells, even under extreme temperature conditions (e.g., at least 300° F.). Without being bound by theory, the inventors contemplate that the retarder is present in an amount effective that delays setting of the cement mixture at a target location having a target temperature of at least 150° C., at least 200° F., or at least 250° C., or at least 300° C., or at least 350° C., for at least two hours. Further, the high-thermal k additives will present in an amount effective such that the cement mixture has, upon setting at a target location, a thermal conductivity of at least 2 W/m ° K, or at least 3 W/m ° K, or at least 4 W/m ° K, or at least 5 W/m ° K, or at least 7.5 W/m ° K, or at least 10 W/m ° K, or at least 15 W/m ° K, and even higher.

Among other suitable high-thermal k additives to the cement compositions, particularly contemplated additives include high-thermal k materials such as graphite, sand, quartz silica, anthracite, various carbon allotropes such as carbon nanotubes and graphene, boron nitride, brass, a brass alloys, chrome nickel steel, carbon steel, stainless steel, one or more transition metals (e.g., copper, cadmium, cobalt, gold, silver, iridium, iron, molybdenum, nickel, platinum, zinc, and the like), one or more transition metal alloys (e.g., a copper alloy, a cadmium alloy, a cobalt alloy, a gold alloy, a silver alloy, an iridium alloy, an iron alloy, a molybdenum alloy, a nickel alloy, a platinum alloy, a zinc alloy, and the like), a post-transition metal (e.g., lead, tin, and the like), a post-transition metal alloy (e.g., an lead alloy, a tin alloy, and the like), an alkaline earth metal alloy (e.g., a beryllium alloy, a magnesium alloy, and the like), aluminum, and any reasonable combination thereof. In certain embodiments, the high-thermal k material may be selected from the group consisting of graphite powder, exfoliated graphite, flaked graphite, pyrolytic graphite, desulfurized petroleum coke, graphene, fly ash, copper powder, aluminum nitride, silicon carbide, and combinations thereof.

Especially preferred additives will exhibit a uniform distribution throughout the cement upon curing and the additives may therefore be micro- or nano-sized, may be in form of platelets (e.g., for carbon allotropes or carbonaceous materials) or in form of fibers (e.g., aluminum or other metal or metal alloy). In addition, and especially where the additive has a relatively hydrophobic nature, the additive may be surface treated to increase hydrophilicity (e.g., by oxidation or other introduction of polar groups such as keto-, hydroxyl-, or carboxyl groups). Still further, and especially where polar groups are present in the additive, it should be appreciated that such polar groups will improve contact with and adhesion to the metal casing of the closed loop geoheat harvesting system. As will be readily appreciated, the quantity of the additives in the cement may vary considerably but will in most typical embodiments be between 1-20 wt %, or between 1-10 wt %, or between 1-5 wt %, or between 1-3 wt % to so achieve a desirable k value for the thermally conductive cement.

Similarly, the thermally conductive filler material for the thermal reach enhancement structures may also vary considerably, and it is generally preferred that the thermally conductive filler material is or comprises a material that has a significantly higher k value than the thermally conductive cement. Moreover, it is contemplated that the thermally conductive filler material for the thermal reach enhancement structures may or may not include a cement component. Most typically, the thermally conductive filler material will have a k value of at least 10-20 W/m ° K as discussed above. Thus, suitable thermally conductive filler materials for the TRE structures will be or will comprise carbonaceous materials, and especially single and/or multi-walled carbon nanotubes, graphene, graphene oxide nanosheets, graphite powder, exfoliated graphite, flaked graphite, pyrolytic graphite, desulfurized petroleum coke, fly ash, micronized anthracite, or metal or metal oxides such as metal fibers or particles of materials such as tin, aluminum, copper, iron, silver, gold, an aluminum copper alloy, or a silver aluminum alloy, and/or metal oxide particles such as silica, alumina, beryllia, copper oxide, zinc oxide, aluminum oxide, hematite, magnetite, and/or tin oxide. Further suitable materials include particles made from or comprising barite, boron arsenite, aluminum nitride, silicon nitride, and/or silicon carbide.

In further preferred aspects, the thermally conductive filler material for the thermal reach enhancement structures will have a particle or fiber size that is suitable for deployment into the fissures that are created to from the thermal reach enhancement structure. Thus, in most cases suitable sizes will be in the micron to millimeter particle or fiber size. In that context, it is especially contemplated that the thermal reach enhancement structures are created by first generating a plurality of fissures in the formation at the deployment location using elevated pressure (e.g., by hydraulic pumping) and the thermally conductive filler material is then delivered to the fractured site at elevated pressure. Subsequently, the elevated pressure can then be reduced in an amount sufficient to reduce fissure width, allowing geomechanical compressive stresses to trap the particles and to effect compaction of the filler material. Alternatively, where the thermally conductive filler material is a cementitious composition, the composition may be delivered to the fissures and allowed to cure. As will be readily appreciated, the filling of the fissures may include where needed or desired one or more proppants. Generation and filling of so generated fissures is known in the related art of oil drilling and production, and all manners of such generation and filling are deemed suitable for use herein. In this context it should be especially appreciated that the use of thermally conductive cement and thermal reach enhancement filler provides several advantages beyond efficient heat transfer from the formation into the working fluid (via the thermal reach enhancement structures and thermally conductive cement). Among other benefits, so generated wellbores with thermal reach enhancement structures and thermal conductive cement that encapsulates the casing will require substantially no maintenance and are not subject to well collapse.

With respect to the working fluid in contemplated systems and methods, it should be appreciated that various working fluids are deemed suitable and include single component and multi-component working fluids. However, it is generally preferred that the working fluid is a single component fluid and most preferably water. As will be recognized, the mass flow in the closed loop geoheat harvesting systems will be a function of several parameters, and it is generally preferred that the mass flow will be modeled in the model as described herein. Based on the inventors' model and other considerations, it is generally contemplated that the mass flow can be optimized to the well geometry and thermal reach enhancement parameters, and that in most cases a higher mass flow rate will result in increased energy extraction. However, such higher mass flow should be balanced with the return temperature of the working fluid. Therefore, and using the inventors' model and field tests, suitable mass flows for water as the working fluid in a closed loop geoheat harvesting system will be between 5-15 kg/s, or between 10-25 kg/s, or between 10-30 kg/s, or between 15-40 kg/s, and in some cases even higher.

Based on the above considerations it should be appreciated that appropriate modeling of heat transfer from a formation to a working fluid via thermal reach enhancement structures and thermally conductive cement in a closed loop geoheat harvesting system heat flow can provide valuable insights to suitable construction for optimized thermal energy harvest. In such cases, and among other parameters, the inventors discovered that enhancing thermal reach by using thermal reach enhancement structures indeed substantially increased the harvested heat, and that the energy extracted increases with increased length of harvester. Moreover, the inventors recognized that higher thermal conductivity of the thermal reach enhancement filler material substantially increased harvested energy, particularly where the thermal reach enhancement structures had specific configurations (e.g., at current state of the art, a conductivity multiplier of the order of $10^2$ was shown to be practical). Moreover, using the models contemplated herein, the inventors appreciated that optimized mass flow increased harvested energy in the closed loop geoheat harvesting systems presented herein.

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of installing a closed loop geoheat harvesting system, comprising:
   obtaining data from a deployment location;
   calculating heat flux in a model using a finite volume (3D) numerical calculation, wherein the model calculates the heat flux as a function of time at a wall of a casing of the closed loop geoheat harvesting system and/or the model further calculates heat flux from the formation into a mass flow of a working fluid in the closed loop geoheat harvesting system;
   using the data in the model to determine one or more configuration and/or operational parameter for a closed loop geoheat system, wherein the model further uses determined or calculated thermal conductivity of a formation at the deployment location; and
   constructing and assembling the closed loop geoheat system based on the configuration and/or operational parameters determined by the model.

2. The method of claim 1, wherein the data from the deployment location are obtained from a rock sample taken at the deployment location and/or a sensor at the deployment location.

3. The method of claim 1, wherein the data from the deployment location are selected from the group of temperature data, location data, range data, thermal conductivity data, rock composition data, and principal stress data.

4. The method of claim 1, wherein the determined thermal conductivity of the formation is an intrinsic thermal conductivity that is determined from a retrieved rock sample.

5. The method of claim 1, wherein the calculated thermal conductivity of the formation is a modified intrinsic thermal conductivity that is based on an intrinsic thermal conductivity and a thermal reach enhancement structure within the formation, wherein the thermal reach enhancement structure comprises a thermally conductive filler having a thermal conductivity that is greater than the thermal conductivity of the formation without the thermal reach enhancement structure.

6. The method of claim 5, wherein the thermal reach enhancement structure has a longitudinal geometry.

7. The method of claim 5, wherein the thermal reach enhancement structure has a radial geometry.

8. The method of claim 5, wherein the thermal reach enhancement structure is thermally coupled to a thermally conductive cement located between the formation containing the thermal reach enhancement structure and a casing of the closed loop geoheat system.

9. The method of claim 5, wherein the thermally conductive filler has a k-value of at least 50 W/m ° K.

10. The method of claim 1, wherein the model uses a plurality of calculations during a time interval at which a working fluid circulates in the closed loop geoheat system, wherein in each of the calculations thermophysical properties are re-computed.

11. The method of claim 1, wherein the configuration and/or operational parameters are selected from the group consisting of mass flow rate of a working fluid, length of a conduit for heat transfer in the deployment location, effective width of a thermal reach enhancement structure, and effective length of a thermal reach enhancement structure.

12. A closed loop geoheat harvesting system, comprising:
   a wellbore extending from a topside to a deployment location and containing a closed loop circuit for a working fluid, wherein the closed loop circuit has a casing that is thermally coupled to a wall of the wellbore via a thermally conductive cement;
   wherein the walls of the wellbore further comprise a thermal enhancement structure that is thermally coupled to the thermally conductive cement and that is filled with a thermally conductive filler;
   wherein the deployment location has a formation temperature of at least 250° C., wherein the working fluid has a return temperature of at least 150° C., and wherein the thermal enhancement structure has longitudinal complex multi-fractured geometry with a width of between 10 and 50 mm and;
   wherein a mass flow rate for water as the working fluid is up to 40 kg/s.

13. The system of claim 12, wherein the thermally conductive cement and/or the thermally conductive filler have a k-value of at least 5 W/m ° K and 50 W/m ° K, respectively.

14. The system of claim 12, wherein the casing that is thermally coupled to the wall of the wellbore via the thermally conductive cement has a length of at least 3 km.

15. The system of claim 12, wherein the length of the thermal enhancement structure is at least 10 m as measured from the wellbore.

16. The system of claim 12, wherein the working fluid has an inlet temperature of no more than 110° C. and a flow rate of 15-25 kg/s.

* * * * *